United States Patent [19]

Gilén et al.

[11] Patent Number: 4,665,515

[45] Date of Patent: May 12, 1987

[54] DIGITAL TELEPHONE SYSTEM

[75] Inventors: Christer W. Gilén; Gunnar L. Kjellander, both of Tyresö, Sweden

[73] Assignee: Telefonaktiebolaget LM Ericsson, Stockholm, Sweden

[21] Appl. No.: 755,330

[22] PCT Filed: Dec. 12, 1984

[86] PCT No.: PCT/SE84/00421

§ 371 Date: Jun. 21, 1985

§ 102(e) Date: Jun. 21, 1985

[87] PCT Pub. No.: WO85/02746

PCT Pub. Date: Jun. 20, 1985

[30] Foreign Application Priority Data

Dec. 15, 1983 [SE] Sweden .................. 8306966

[51] Int. Cl.[4] .................................. H04Q 11/04
[52] U.S. Cl. ...................................... 370/67
[58] Field of Search ............. 370/67, 58, 66, 85; 340/825.5, 825.51

[56] References Cited

U.S. PATENT DOCUMENTS

| | | | |
|---|---|---|---|
| 4,069,399 | 1/1978 | Barrett et al. | 370/67 |
| 4,287,590 | 9/1981 | Boute et al. | 370/67 |
| 4,370,743 | 1/1983 | Moran | 370/67 |
| 4,581,733 | 4/1986 | Sarson et al. | 370/67 |

Primary Examiner—Douglas W. Olms
Attorney, Agent, or Firm—Roberts, Spiecens & Cohen

[57] ABSTRACT

The invention relates to a telephone system including a central exchange (EX) to which a plurality of telephone sets (TA) are connected via two-wire lines, for transferring digital information in time-division form between the sets. The system is entirely digitized and contains a central processor board (EXCP) in the exchange with a central processor (CP) and memory units common to the system, a plurality of speech control boards (CCDX), and a plurality of line boards (LIDI). Each of the speech control boards and line boards contain a regional processor (RP) in connection with the central processor through a control bus (SB) specially arranged for control signalling. Each speech control board contains a plurality of speech control units (SC) and each line board contains a plurality of line circuits (DEC). The speech control units and line circuits are connected to an internal communication bus (TB) for transferring pulse code modulated information between the telephone sets (TA). Two 2-wire lines are connected to each line circuit (DEC), each two-wire line corresponding to a telephone set. In each telephone set there is included a further line circut (DIC) containing, inter alia, means for coding and decoding PCM signals. An advantage with the system is that it lacks central switching equipment for channel selection. Channel selection means (CHR) are included in said first line circuits (DEC), with the aid of the regional processor (RP), said means connecting the lines to channels determined by the central processor under control of said central processor.

5 Claims, 2 Drawing Figures

DIGITAL TELEPHONE SYSTEM

FIELD OF INVENTION

This invention relates to a telephone system which is an entirely digital system including a central exchange to which a plurality of telephone sets are connected via lines for transferring digital information in time division between the sets. The system is particularly suitable for smaller installations, e.g. intercom systems.

BACKGROUND ART

Generally, systems utilized in the prior art are not completely digitized all the way to the connected telephone sets. Instead they are analog systems.

DISCLOSURE OF INVENTION

Even in relatively small systems in the prior art, a central group selector unit is used for establishing calls between different subscribers. Since the systems are furthermore not digitized out to the telephone sets, this results in problems whereby such systems are technically complicated and provide expensive solutions.

SUMMARY OF INVENTION

It is an object of the invention to provide an improved telephone system.

The telephone system in accordance with the invention solves above problems by a system enabling the establishment of connections without a central selector and by being digitized up to and including the telephone set.

The inventive telephone system is thus a digital system in which a plurality of extensions can each be connected via its own telephone set to an exchange. Information between the subscribers is transferred in time multiplex, which means that each of the subscribers, when establishing a connection in the exchange, is assigned an unoccupied time slot (channel) for transferring information. As mentioned, the system includes a digital exchange where speech is PCM-coded and decoded in the telephone set. Each set is connected to the exchange for example by a two-wire connection, through which, inter alia, PCM codes are transferred to and from the sets in a so-called burst signalling system, which means that the signals are transmitted in groups or bursts. In 4-wire communication, the need of burst signalling is eliminated. The telephone sets also obtain their current supply through said connection. In its simplest form the exchange consists of a rack with a plurality of printed circuit boards (PCB).

The basic boards in the exchange are a central processor board EXCP, a line board LIDI for connecting ten lines, for example, and a speech control board CCDX with a plurality of call options. The exchange may of course be equipped with several line boards and several control boards, as well as other types of boards. Each PCB contains a regional processor RP which communicates with the central processor board via a common serial control bus SB.

The technical advantages of the system are of course that the possibility is afforded of easily offering a high degree of excellent service, i.e. a large selection of services simultaneously as a simple system makes for large cost advantages compared with known systems.

BRIEF DESCRIPTION OF DRAWINGS

The system in accordance with the invention will be described below in detail with reference to the accompanying drawings, in which.

DETAILED DESCRIPTION

Figure 1:
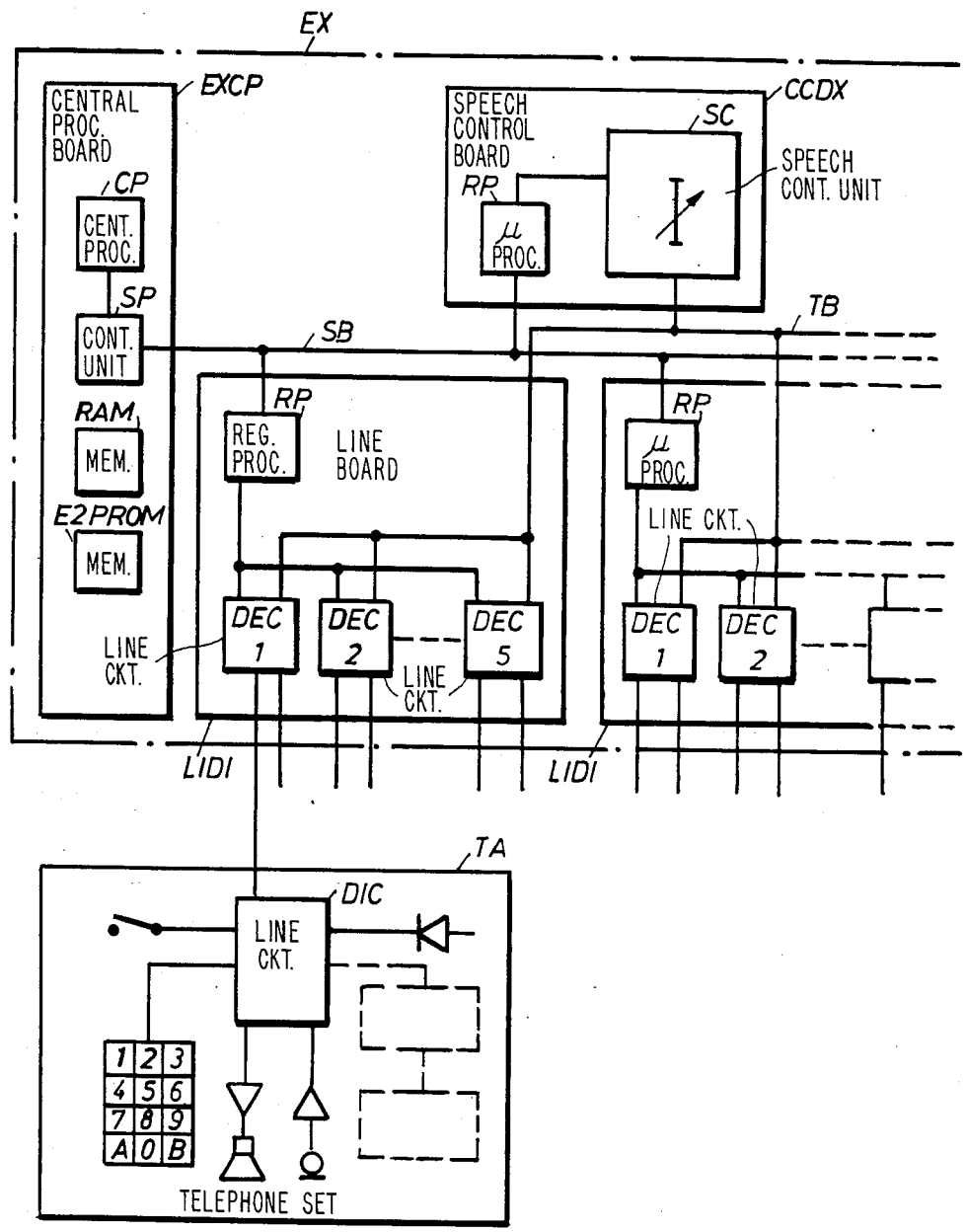
FIG. 1 is a block diagram of a system provided in accordance with the invention.

As apparent from FIG. 1, the central processor board EXCP includes a central processor CP (a microprocessor of the type 6809), a control unit SP (a microprocessor of the type 68120) and the memory units RAM type 6116 (data memory) and E2PROM type 2816 (program memory).

All the PCB's (line board LIDI and speech control board CCDX) are connected to the central processor board via the common serial control bus SB. As mentioned, the line boards each contain a regional processor RP (a microprocessor type 6801), to which is connected a line circuit DEC, to which can be connected two lines. Each line board may contain 5 such line circuits DEC, each with two line connection facilities. All the line circuits DEC are, on the exchange side, via a first input/output connected to the input/output of said microprocessor RP on its own line board, the circuits DEC being connected through other inputs/outputs to a common PCM bus TB, through which signalling and speech information is exchanged in parallel between the extensions connected to the exchange. Each line circuit DEC contains transmission logic and a processor register for two lines. Each of the line outputs from the respective line circuit is connected via a line to a telephone set TA containing a further line circuit DIC, in which is included a PCM codec for coding and decoding the PCM signals sent to, or received from the exchange. The function of the circuit DIC is described in detail in the Swedish Pat. No. 7714964-9. The circuit DIC also contains transmission logic and logic for pushbutton scanning. The telephone set further includes pushbutton set, cradle, loudspeaker, microphone, display, etc. As mentioned, for speech communication all boards except the central processor board EXCP are connected to a parallel PCM bus. The PCM bus is time-divided into 32 channels where each channel is divided into two halves, one for sending and one for receiving. The halves can be shifted with the aid of a control bit for cross-wise interconnection of telephone set.

The signals to and from the telephone sets are sent serially and consist of signal words of eight bits, of which six bits are PCM bits and two bits are control bits which are not PCM-coded.

The two mentioned subscriber circuits (line circuits) DEC and DIC are used for the signalling between the telephone set and line board. The information from the exchange to the telephone sets is sent continuously so that the sets are always provided with up-to-date exchange information. The information from the sets to the exchange is also sent continuously, resulting in that the regional processor RP in the line board LIDI can uninterruptedly read off the status of the set in question, and decide if and when a valid change has occurred, e.g. whether a number button is depressed in the push button set. PCM bits and control bits are transferred to and from the PCM bus in parallel. It is possible to select whether the control bits to the set are to be transferred from the PCM bus direct or via the regional processor in the line board.

To a large extent, the exchange function is based on the function of the line circuit DEC. This contains, as previously mentioned, an interface against two extension lines, an interface to the internal PCM bus TB and an interface to its microprocessor RP. The mentioned burst signalling system is utilized for information exchange between telephone set and line circuit DEC, such that the line circuit DEC sends out a burst consisting of a PCM sample and gets in return a PCM sample from the set. A control bit accompanies each PCM sample. 32 successive control bits build up a 32-bit control word frame both to and from the set. A further bit EOF (End Of Frame) accompanies each PCM sample to distinguish which bit is which of these 32 bits. This EOF bit is always low, except for bit number 32 when it is high. The bit thus functions as a frame separation bit.

The line circuit DEC contains, inter alia, a 32 bit control word register STL. The register is chargeable from the microprocessor RP and its information is directed to the telephone set. Alternatively, the control word frame together with the EOF bit can be obtained directly from the internal PCM bus. The control word frame directed to the set is used to control apparatus functions, e.g. a display, to tell the set what stage a connection is in and so forth.

The corresponding control word frame from the telephone set is used to discover button pushes, type of set, lifted handset and so forth. The last 8 bits in the control word frame from the set are stored in an 8 bit register SFL (Signal From Line) in the circuit DEC, this register being readable from the related local, regional microprocessor RP, which thus constantly monitors condition changes in the register. If the telephone set does not react to the signal information from the exchange line circuit DEC, then all the bits in the register SFL are set to high level via a time circuit in the line circuit, which in a simple way in the exchange, permits the discovery of line faults or that a telephone set is lacking. The content in the register SFL is updated continuously, which means that decisions on the validity of the information are made in the microprocessor. Telephone set construction can thus be simplified, and the effect of line interference eliminated. There is furthermore eliminated need of equipment in the telephone sets for filtering button bounces.

The control information from set to exchange is also sent out on the internal PCM bus as two extra bits in each PCM sample, and is thus available for the whole system. This situation can be utilized when there is a demand for great rapidity, e.g. at switching between loudspeaking and lowspeaking functions during a call in progress, i.e. when the normal transfer between the connected microprocessors is considered too slow.

One of the advantages with the system is that the exchange operates without a central switch for establishing a call. Each line in each DEC-circuit is assigned, via a channel register CHR for each line, to operate in an optional channel (time slot). As previously mentioned, each channel is divided into two halves, one for a microphone and one for a loudspeaker. Which half is which is selected by a bit in the channel register CHR. With this arrangement two telephone sets can be connected directly to each other in the same channel. By output of a further bit from the channel register there is the possibility of activating the microphone half in a channel, such that when the bit is of low level no PCM sample is released to the internal PCM bus. This enables several sets to listen on the same channel simultaneously. In the exchange the first channel (0), for example, is used for silence and register tone, i.e. both channel halves are used for controlling the loudspeakers of the telephone sets. In the rest position the bits in the channel register are set so that the loudspeakers of the telephone sets are connected to the silent position. When some extension begins impulsing from its telephone set, the loudspeaker is switched to the register tone position. By changing the loudspeaker/microphone bit in the line circuit DEC different tone characteristics can also be achieved without changing channel. Since several lines can listen to the same channel simultaneously, it is easy to provide services such as background music, central information and acoustic searching. All these functions, which are to be found in the line circuit DEC, enable a single microprocessor to monitor ten lines, i.e. five DEC circuits per line board LIDI.

By support of FIGS. 1 and 2, a switching sequence through the exchange is described below. To increase understanding of the sequence a short account is also given of starting the exchange.

By signals applied to the control bus SB, common for all regional processors RP on the different boards, the central processor CP orders that all boards shall report themselves. The regional processors on each board report board type (line board LIDI, duplex board CCDX etc), number of individuals per board and which board place they occupy in the frame.

The central processor CP stores all information in a E2PROM memory (type 2816), and assigns to all lines an extension number which is also stored in the memory. The central processor further orders one of the individuals on a duplex board (speech control board) CCDX to put out a tone signal with the frequency 500 Hz in one half of channel 0 on the PCM bus, and to be silent in the other channel half. This tone is used for sending a register tone, busy tone and so forth to lines in such connection cases where these are not connected to a duplex of their own.

Figure 2:
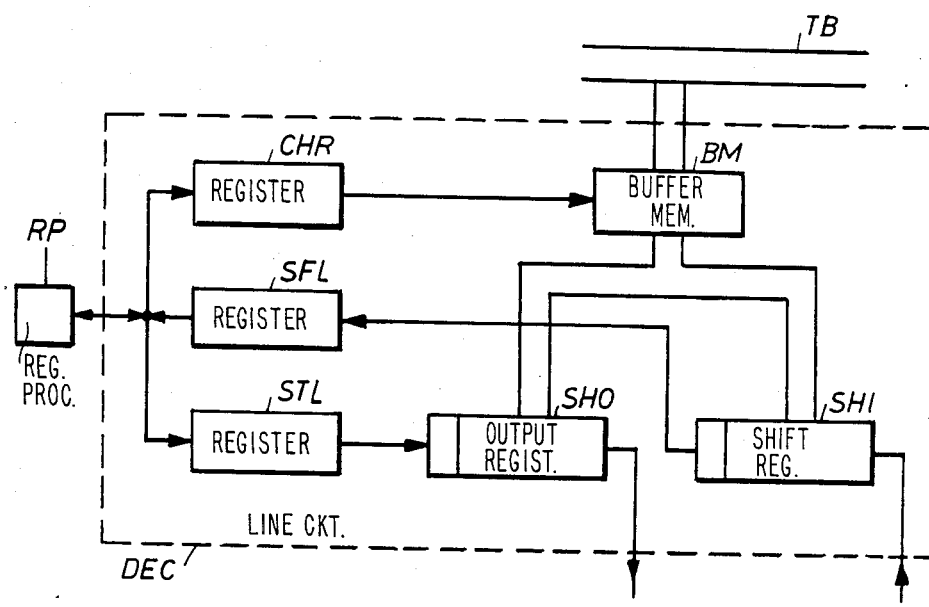
FIG. 2 is a block diagram of a line circuit DEC included in the system of FIG. 1.

A block diagram is illustrated in FIG. 2 of the parts essential to the invention in the line circuit DEC.

Each line circuit DEC contains a plurality of registers for storing and transfering signals. The information sent out in series from a telephone set is received on the line input of the line circuit in a first shift register SHI, from which the information is passed on in parallel to the input of a buffer memory BM, wherefrom the information is sent to the internal PCM-bus TB. Furthermore, the control bits in incoming information are sent from the input register SHI to the register SFL (Signal From Line) and from there to the regional processor RP, which scans the register SFL the whole time concerning condition changes in the signal.

A register STL (Signal to Line) further expedites control bit information from the processor RP to a second shift register SHO on the line output of the line circuit. The output register SHO aslo accepts information in parallel form from the PCM bus TB via the buffer memory BM, and sends its own information in serial form out on the two-wire line to the telephone set. The register CHR is the so-called channel register, in which information is stored as to in which channel the line circuit DEC shall operate and how it shall operate, i.e. in which channel half it shall listen, in which channel half it shall send the telephone set microphone information, whether it may send this information and whether the circuit DEC may send information to the telephone set line circuit DIC. As is further apparent from FIG. 2, the output from the channel register CHR is connected to an input on the buffer memory BM. The signal from the channel register controls the output of information from the buffer memory and thereby determines in which time slot (channel) the memory information shall be read out.

A channel register CHR contains 5 bits for stating channel number and 3 bits for controlling the functions of the line circuit DEC. A clock common to the system and situated on the central processor board conventionally controls reading and writing in registers and memories and is therefore not accounted for in detail. In the rest position, the line circuit DEC sends continuously towards the connected telephone sets the PCM code which signifies silence, i.e. the set is assigned the channel which always means silence (channel 0). Since the local coder of the telephone set is always switched off in the rest position, the set always replies with the same PCM code back again to the line credit DEC. Bit information also goes from the circuit DEC in the rest position to the telephone set display and from the pushbutton set of the telephone to the line circuit DEC.

The following occurs for a call from a line. Assume that a person at extension A desires to speak to a person at extension B. A either lifts the telephone handset and presses a button, if there is a lowspeaking call, or only presses a button if there is a loudspeaking call with the telephone handset replaced. The keying indicates the first digit in the B subscriber's number. This changes the code sent from the telephone set, the code being sent through the line circuit DEC and being scanned in the regional processor RP via the line circuit register SFL (Signal From Line). When the processor RP has registered the change it sends a message to the central processor CP via the control bus SB reporting which button which has been pressed. The channel 0 is common for all subscribers and, as previously mentioned, the channel is divided into two halves, one for silence and one for a reigster tone, the circuit DEC being able to listen to both halves.

When the central processor CP has received the call from the regional processor RP, it sends a code to the line circuit channel register CHR and sets that bit which means change of channel half, i.e. from silence to register tone. The circuit DEC then sends the register tone to the telephone set. Control information to the telephone set line circuit DIC is also sent through the register STL (Signal To Line), resulting in that a LED light emitting diode in the telephone set illuminates to show that a connection establishment or call is in progress and that the amplifier to the set loudspeaker is activated so that a register tone and, later on, speech can be heard.

The subscriber A takes the next digit, the central processor CP detects the change and replies, by changing a bit in the channel register CHR, return to the silent channel half in channel 0. The A subscriber continues dialing, the microprocessor RP on the connected line board LIDI passes on, the information to the central processor CP, which makes a comparison for each received digit as to whether a complete B number has been received. The comparison is made for all the extension numbers previously stored in the memory E2-PROM. The central processor CP establishes that the dialed digits correspond to one of the stored numbers. Remaining stored data concerning this number tell that it is a line, the location of the board in the exchange and that a speech control unit (duplex) SC is required to connect the A subscriber (the calling) with the B subscriber (the called). The central processor also knows that the B subscriber is idle since the status of each subscriber line is continuously scanned and reported via the respective regional processor RP. The central processor is informed via the processors RP on the speech control boards as to which speech control units SC are idle. The central processor itself handles the assignment of channels (time slots) and there is of course also knowledge as to which channels are free.

The central processor seizes an idle speech control unit and two idle channels, of which one is assigned the A extension and the other the B extension. The central processor CP informs the B-side line board LIDI and the selected speech control unit on the speech control board CCDX as to which channel on the PCM bus TB they shall be connected.

The regional processors RP on the boards LIDI and CCDX execute the connection and the A subscriber and B subscriber are thus connected to the speech control board CCDX.

With the aid of control signals on the control bus SB the central processor now orders the speech control board CCDX to send out a tone signal to both B subscriber and A subscriber on the respective channel loudspeaker half, and to connect the subscriber via the processor RP on the duplex board.

The subscriber answers the call and the central processor switches the speech control unit to control the speech in a conventional manner. At the same time, the central processor sets that bit in the respective channel register CHR of the respective line circuits DEC, which gives permission to send microphone information from the telephone sets through the speech control unit via the internal PCM bus TB.

Disconnection of calls takes place in the following manner. The regional processor RP on the respective line board continues, during the whole time that a call is in progress, to send the central processor messages as to possible status changes. When the processor CP receives pushbutton signals signifying disconnection, a disconnection order is sent to all connected units. The central processor sends messages to the connected regional processors RP on the line boards to connect the line circuits DEC, via the channel registers CHR, to the silent half of channel 0. The speech control unit is then declared idle. The two channels utilized are declared idle to a channel handling program in the program memory of the central processor.

The pulse code modulation PCM principle is not accounted for since it is assumed to be known.

What is claimed is:

1. Apparatus in digital telephone systems including a switch-less central exchange (EX) of the time multiplex type, with a plurality of time channels, the exchange including first line circuits (DEC) for connection via lines to second line circuits (DIC) arranged in telephone sets (TA), said second line circuits each including means for coding and decoding pulse code modulated signal words, said exchange and lines being arranged for transmission of digital information in time-division form between said telephone sets and the central exchange including a central processor (EXCP) common to the system, a plurality of speech control boards (CCDX) and a plurality of line boards (LIDI), each of the boards including a separate regional processor (RP), said exchange, for establishing speech channels and transferring information between said telephone sets, including: in each line board (LIDI), at least one line circuit (DEC) having a plurality of inputs and outputs and including channel selection means (CHR) which, under control of the central processor (CP), connect, via said regional processor (RP), said line to an optional channel determined by the central processor, at least one first input and at least one first output of the line circuit (DEC) being connected to a communication bus (TB) common to at least some of said line circuit units (DEC), at least pulse code modulated signal words being exchanged via said bus, and at least one second input and a second output of a plurality of said line circuits included in said line boards being connected to common inputs and outputs of said regional processor (RP), at least one input and one output of said regional processor being connected to a control bus (SB) common to all of said regional processor (RP) and controllable from said central processor (CP), through which bus control information is exchanged, and said speech control boards (CCDX) including a plurality of speech control units (SC) having inputs and outputs connected to said communication bus (TB) and further inputs and outputs connected to a common regional processor (RP) arranged on each speech control board, which regional processor is in turn connected to said control bus (SB) via inputs and outputs.

2. Apparatus as claimed in claim 1, wherein said channel selection means (CHR) is a register in which the number of a selected channel is registered.

3. Apparatus as claimed in claim 1, wherein said channels corresponding to time slots in a time multiplex system.

4. Apparatus as claimed in claim 3, wherein for crosswise connection of two telephone sets (TA) in the same channel, each channel is divided into two time slots, which time slots are defined by a control bit in the respective channel register as either a microphone or loudspeaker half.

5. Apparatus as claimed in claim 4, wherein selected of said telephone sets are connected to a selected time slot in a plurality of common time slots.

* * * * *